United States Patent [19]

Rodeck

[11] 4,289,391

[45] Sep. 15, 1981

[54] SHUTTER SPEED DISPLAY FOR VIEWFINDER OF A PHOTOGRAPHIC CAMERA

[75] Inventor: Hans J. Rodeck, Erkerode, Fed. Rep. of Germany

[73] Assignee: Rollei-Werke Franke & Heidecke GmbH & Co., Brunswick, Fed. Rep. of Germany

[21] Appl. No.: 116,775

[22] Filed: Jan. 30, 1980

[30] Foreign Application Priority Data

Jan. 30, 1979 [EP] European Pat. Off. ........... 79100261

[51] Int. Cl.³ ...................... G03B 13/02; G03B 17/20
[52] U.S. Cl. ................................... 354/219; 313/500; 354/289
[58] Field of Search ............... 354/23 D, 53, 219, 289, 354/220–225; 313/500, 511, 110, 111; 362/242, 244, 800; 340/366 B

[56] References Cited

U.S. PATENT DOCUMENTS 4,074,292 2/1978 Nakamoto et al. ................... 354/53

FOREIGN PATENT DOCUMENTS 2658699 7/1977 Fed. Rep. of Germany ........ 354/53

Primary Examiner—John Gonzales
Attorney, Agent, or Firm—Schwartz, Jeffery, Schwaab, Mack, Blumenthal & Koch

[57] ABSTRACT

A viewfinder display in a photographic camera in which the viewfinder includes a viewing opening and a line of light emitting diodes for indicating a range of camera settings, the line having at least first and second portions. A lens is provided between the viewing opening and one of the first or second portions to visually distinguish the first and second portions from one another.

6 Claims, 7 Drawing Figures

SHUTTER SPEED DISPLAY FOR VIEWFINDER OF A PHOTOGRAPHIC CAMERA

BACKGROUND OF THE INVENTION

The invention generally relates to a display in a photographic camera and particularly to the display of the shutter speeds by means of a line of light emitting diodes (LED's) in the viewfinder.

Shutter speed displays which take the form of a line of LED's in photographic cameras, especially SLR cameras, are relatively common. LED's are light emitting semi-conductor diodes which appear as tiny spots of light in the viewfinder of a camera. LED lines are comprised of closely adjacently disposed individual LED's wherein depending upon the camera, an aperture setting or shutter speed value is associated with each individual LED.

In high quality SLR cameras in which the exposure is set automatically either as an automatic shutter speed setting or aperture setting, LED lines serve as the only means of monitoring the shutter speed or aperture settings chosen by the automatic control and as the only means of recognizing absolute limit values in order to avoid over or under exposure.

If the operator tends to rely on the automatic exposure control of a camera, the LED signals in the viewfinder are given in most cases only fleeting and unconcentrated attention and checking them may even be forgotten. In this way, it can happen that from one exposure to another involving different levels of brightness of the objects, the change of exposure time, e.g. from 1/60th as a fast exposure to ⅛th of a second as a marked time exposure goes unheeded, because the distance between the individual LED's in the line amounts to only a few millimeters. The viewing eye during a fleeting glance will not immediately note the minor spatial distance between the LED for 1/60th of a second and that for ⅛th of a second. Therefore, although the exposure will be correctly taken at ⅛th of a second, the shutter speed may be so slow that if the camera is hand-held, the image may be blurred by movement.

SUMMARY OF THE INVENTION

Therefore, it is an object of the present invention to avoid the above-noted disadvantages and in the case of an automatic camera, provide a viewfinder display utilizing a LED line which clearly indicates the range of fast exposure times.

It is a further object of the present invention to provide a viewfinder display which, without an increase in cost, will clearly indicate when it is no longer possible to handhold a camera during the taking of pictures because of the extremely slow shutter speed.

The above and other objects are achieved by providing a viewfinder display in a photographic camera wherein the viewfinder includes a viewing opening and a line of light emitting diodes for indicating a range of camera settings, the line having at least first and second portions, the camera including means for visually differentiating, at least to an operator looking into the viewfinder, light emitted from the first portion of the line from light emitted from the second portion of the line. In preferred embodiments of the invention, a lens is interposed between the viewing opening and the line of light emitting diodes and indicates visually when the camera shutter speed is below a preset level.

BRIEF DESCRIPTION OF THE DRAWINGS

A more complete appreciation of the invention and the attendant advantages thereof will be more clearly understood by reference to the following drawings, wherein.

DETAILED DESCRIPTION OF THE PREFERRED EMBODIMENTS

According to the present invention, difficulties in easily determining the critical shutter speed are resolved in that the LED line structure in the zone of the slower exposure times is constructed to be visibly markedly different from the line structure in the zone of the faster exposure times. This has the advantage that the viewer's eye easily perceives the visibly different forms. Thus, errors in reading this information in the viewfinder will occur rarely, if ever. In an advantageous further development of the invention, in order to achieve a structural difference, optical means are integral with and moulded to a planar transparent covering over the LED spots. This has the advantage that without a change in the number or type of LED's used, the eye can easily perceive the differently appearing images.

Figure 4:
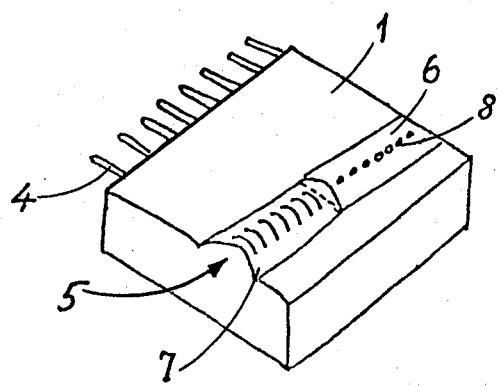
FIG. 4 is a perspective view of the LED scale of FIGS. 1a and 1b.

Referring now to the drawings wherein like reference characters designate like parts throughout the several views, FIG. 4 is a perspective view of a Plexiglass block 1 with an LED scale. Incorporated into the Plexiglass block is a carrier grid 4 with LED's. In order to improve the clarity of the illustration, the individual LED's and their supply conductors in the Plexiglass block 1 have been omitted and only their image 8, which becomes visible on the scale 5, is shown.

The scale 5 which is provided in the camera viewfinder, is subdivided into a planar reading portion 6 with light dots of LED's for fast exposure times, and a ridged convex reading portion 7 with light dots for the longer exposure times. This ridged convex reading portion 7 of the scale 5 consists of a cylindrical lens over the LED spots which are located deeply in the Plexiglass block. By reason of the form of cylindrical lens, these LED spots appear as strips on the surface of the scale. On the plane reading portion of the scale, the LED spots appear as spots.

FIGS. 1, 2 and 3 show different embodiments of the ridged convex reading portion 7 of the scale 5 in plan and sectional views.

Figure 1A:
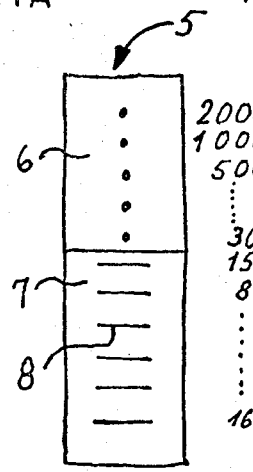
FIGS. 1a and 1b are plan and sectional views, respectively, of a LED scale according to one embodiment of the present invention.
Figure 1B:
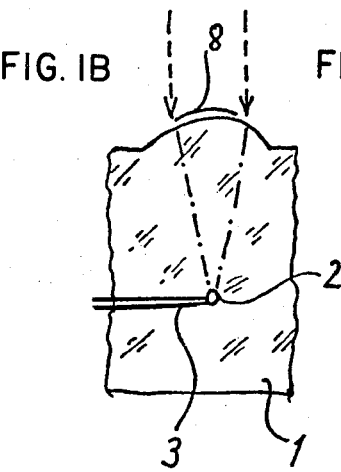

FIGS. 1a and 1b show the embodiment of a rigid convex reading portion in the form of a cylindrical lens which has already been described with reference to FIG. 4. In the Plexiglass block 1 is the LED 2 with its connecting lead 3. As a result of the cylindrical convexity of the surface of the reading portion 5, the spot of light emitted by the LED appears on the surface as a strip-like image 8. In plan view, it can be seen that these strip-like images 8 of the LED's 2 are present only in the case of longer exposure times of up to 1/15th of a second. The exposure times appropriate to the hand-held camera and ranging from 1/30th to 1/2000ths on the other hand are not depicted as strips but as dots, by virtue of the fact that the plane reading portion 6 of the scale 5 has a flat surface. This visual stressing of the longer exposure times on the LED scale of a camera viewfinder means that the eye of the operator of an object which is to be photographed can readily and almost unthinkingly note that the exposure conditions for the object which is to be photographed have so altered that a photograph by a hand-held camera has become impossible.

Figure 2A:
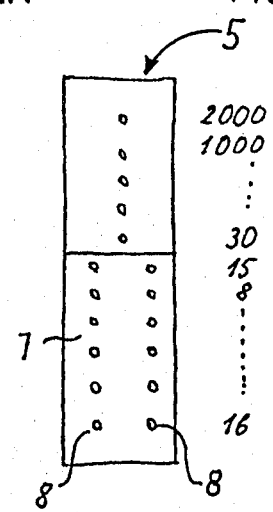
FIGS. 2a and 2b are plan and sectional views, respectively, of a further embodiment of the present invention.
Figure 2B:
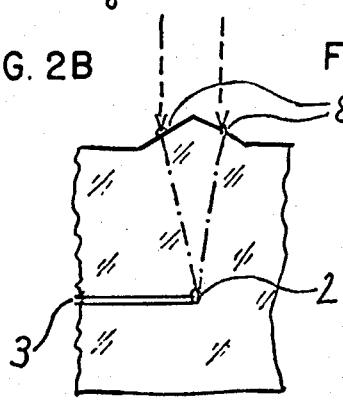

FIGS. 2a and 2b show a modified form of the reading scale 5. Except for the ridged convex reading portion 7, all details correspond to those already described with reference to FIGS. 1a and 1b. In this embodiment, the ridged reading portion 7 consists of a roof-like edge over the LED spots 2. On the slopes of the roof-shaped edge, the LED's 2 are visible in a punctiform image 8. For the long exposure times therefore in each case two images 8 are available by way of clear differentiation from the short exposure times.

Figure 3A:
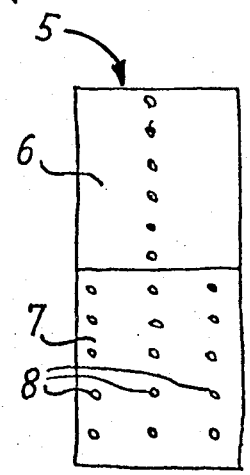
FIGS. 3a and 3b are plan and sectional views, respectively, of a further embodiment of the present invention.
Figure 3B:
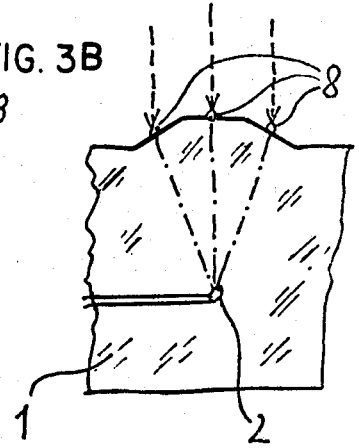

In FIGS. 3a and 3b, instead of the cylindrical lens described with reference to FIGS. 1a and 1b and the roof-like edge described with reference to FIGS. 2a and 2b, there is a truncated roof shape. This truncated roof shape depicts the LED's 2 in three rows on the reading scale 5 so that here, too, in comparison with the flat reading portion which has only one row of illuminated dots, the viewer has a clear differentiation between long exposure times and exposure times suitable for a hand-held camera.

The above-described LED display operates in the following way: in order to achieve a certain depth of field, the photographer, in order to photograph an object at a certain distance, will use a definite aperture setting. With modern SLR cameras, the shutter speed will then be automatically adjusted according to the brightness of the object and the preset film sensitivity. The shutter speed automatically selected by the camera for a specific aperture setting will be displayed by LED's in the camera viewfinder. However, since the eye of the photographer is mostly concentrated on the object to be photographed, it can ignore the LED display of an exposure time which is no longer suitable for a hand-held camera. In order to obviate this oversight of an inadequate exposure time, instead of only one spot of light, two, three or more spots of light appear in the embodiments according to the invention if the automatically set shutter speed is longer than 1/30th. By virtue of this jump in the reading scale showing the exposure times, the eye of the photographer, even with superficial observation of the reading scale located at the end of the viewfinder image, can varify that he is advantageously warned against faulty exposures.

Although the invention has been described relative to a specific embodiment thereof, it is not so limited and many modifications and variations thereof will be readily apparent to those skilled in the art in light of the above teachings. For example, the diode display could indicate lens aperture in an automatic camera which uses a preselected shutter speed. The aperture setting utilized determines the depth of field of the lens and such a visual differentiation between aperture settings may be helpful in warning the camera operator prior to taking the picture. It is, therefore, to be understood that, within the scope of the appended claims, the invention may be practiced otherwise than as specifically described.

The embodiments of the invention in which an exclusive property or privilege is claimed are defined as follows:

1. A viewfinder display for a photographic camera having a viewfinder, said viewfinder including a viewing opening and a line of light emitting diodes for indicating a range of camera shutter speed settings, said line having at least first and second portions, said one of said portions of said line of light emitting diodes corresponds to shutter speed settings which are not conducive to hand-held camera operation, said viewfinder display including means for visually differentiating, to an operator looking into said viewfinder, light emitted from said first portion of said line from light emitted from said second portion of said line, wherein said means comprises:
   means for refracting light from said first portion of said line; and means for non-refractively passing light from said second portion of said line.

2. The viewfinder display of claim 1, wherein said refracting means comprises a lens disposed between said viewing opening and at least said first portion of said line.

3. The viewfinder display of claim 2, wherein said lens has a cross section of a lenticular form.
,12
4. The viewfinder display of claim 2, wherein said lens has a cross section of a prismatic roof ridge form.

5. The viewfinder display of claim 2, wherein said lens has a cross section of a truncated prismatic roof ridge form.

6. The viewfinder display of claim 2, wherein said refracting means and said non-refractively passing means comprise a single optical structure disposed between said viewing opening and said line and said non-refractively passing means comprises a planar portion of said structure disposed between said viewing opening and at least said second portion of said line.

* * * * *